(12) United States Patent
Yu et al.

(10) Patent No.: US 7,393,131 B2
(45) Date of Patent: Jul. 1, 2008

(54) SURFACE LIGHT SOURCE HAVING LIGHT GUIDE PLATE WITH PRISMS

(75) Inventors: Tai-Cherng Yu, Tu-Cheng (TW); Charles Leu, Fremont, CA (US); Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 253 days.

(21) Appl. No.: 10/950,735

(22) Filed: Sep. 27, 2004

(65) Prior Publication Data
US 2005/0105282 A1 May 19, 2005

(30) Foreign Application Priority Data
Nov. 14, 2003 (TW) .............................. 92131958 A

(51) Int. Cl.
*F21V 7/04* (2006.01)
(52) U.S. Cl. ..................... 362/620; 362/619; 362/626; 362/627
(58) Field of Classification Search ................. 362/603, 362/606, 617, 619, 620, 625, 626, 308, 309, 362/328, 329, 339, 612, 618, 623, 624, 628
See application file for complete search history.

(56) References Cited

U.S. PATENT DOCUMENTS

| | | | | |
|---|---|---|---|---|
| 5,703,667 A * | 12/1997 | Ochiai | ........................ | 349/65 |
| 6,011,602 A * | 1/2000 | Miyashita et al. | ............. | 349/65 |
| 6,123,431 A * | 9/2000 | Teragaki et al. | ............. | 362/625 |
| 6,164,790 A * | 12/2000 | Lee | ............. | 362/618 |
| 6,467,925 B2 * | 10/2002 | Egawa et al. | ................ | 362/608 |
| 6,692,133 B2 * | 2/2004 | Katsu et al. | ................ | 362/620 |
| 7,018,088 B2 * | 3/2006 | Yu et al. | ..................... | 362/620 |
| 7,125,154 B2 * | 10/2006 | Blanc | ........................ | 362/620 |
| 2003/0206408 A1* | 11/2003 | Funamoto et al. | ............. | 362/31 |
| 2004/0022050 A1* | 2/2004 | Yamashita et al. | ............ | 362/31 |
| 2004/0090765 A1* | 5/2004 | Yu et al. | ...................... | 362/31 |

FOREIGN PATENT DOCUMENTS

| | | |
|---|---|---|
| CN | 1190195 A | 8/1998 |
| CN | 2341165 Y | 9/1999 |
| JP | H08-201807 A | 8/1996 |
| JP | H08-203312 A | 8/1996 |

* cited by examiner

*Primary Examiner*—Thomas M. Sember
(74) *Attorney, Agent, or Firm*—Morris Manning Martin LLP; Tim Tingkang Xia, Esq.

(57) ABSTRACT

A surface light source (4) includes a light guide plate (2) and a light source (5). The light guide plate has an incident surface (21) and an emitting surface (22). The light source is adjacent to the incident surface of the light guide plate for radiating light beams into the light guide plate through the incident surface. The emitting surface defines a large number of prisms (221), in which the distance (L) separating each two adjacent prisms changes according to an intensity of the light beams received from the light source. In particular, the pitch between two prisms decreases with increasing distance away from the light source. By the cooperation of the prisms and the light source, the surface light source has uniform illumination over the whole emitting surface.

16 Claims, 3 Drawing Sheets

SURFACE LIGHT SOURCE HAVING LIGHT GUIDE PLATE WITH PRISMS

BACKGROUND OF THE INVENTION

1. Field of the Invention

The present invention relates to a light guide plate of a surface light source used in a liquid crystal display (LCD), and particularly to a surface light source having a light guide plate with prisms configured to provide uniform illumination.

2. Prior Art

In general, LCDs have two main advantages in comparison with cathode ray tubes (CRTs): LCDs are thin, and have low power consumption. It has been said that LCDs might one day completely replace CRT display devices, and LCDs have aroused great interest in many industries in recent times. In general, an LCD needs a surface light source to provide even light for a clear display.

A surface light source comprises a light source and a light guide plate. The light source may be a linear light source, or one or more point light sources. The light guide plate has an end face through which light is introduced, and two opposite major faces one of which functions as an emission face. The performance of the surface light source greatly depends on the characteristics of the light guide plate employed therein.

A light guide plate functions to change a direction of propagation of light beams emitted from the light source and introduced into the light guide plate, from a direction roughly parallel to the emission face of the light guide plate to a direction perpendicular to the emission face. That is, the light guide plate effectively changes the linear or point light source(s) into a surface light source, for evenly illuminating a whole display screen of the LCD.

FIG. 4 shows a conventional surface light source 1, which comprises a reflector 12, a light guide plate 13, a diffuser 14, a brightness enhancing film (BEF) 15, and two point light sources 11. The reflector 12, the light guide plate 13, the diffuser 14 and the BEF 15 are stamped together from bottom to top in that order. The point light sources 11 are disposed adjacent an incident surface 131 of the light guide plate 13. The BEF 15 has a plurality of parallel prisms 151 evenly disposed on a surface (not labeled) thereof. In use, light beams from the point light sources 11 enter the light guide plate 13 through the incident surface 131, and then are introduced into the BEF 15 in a direction perpendicular thereto. The BEF 15 converges the light beams in a predetermined direction to evenly illuminate a whole display screen of an associated LCD.

FIG. 5 shows an essential optical intensity distribution of the light beams in the light guide plate 13. FIG. 6 shows an essential optical intensity distribution either one of the point light sources 11. Each point light source 11 emits light beams over a limited predetermined range of angles, and the light beams enter the light guide plate 13 with an uneven distribution. As a result, three dark areas 261, 262, 263 are created in the light guide plate 13. The luminance of the dark areas 261, 262, 263 is less than that of a remaining main area of the light guide plate 13. The surface light source 1 does not attain uniformity of light beams exiting therefrom.

In addition, the surface light source 1 comprises the plural above-described elements, including the diffuser 14 and the BEF 15, for enhancing brightness. This adds to the size and the cost of the surface light source 1.

A new surface light source and a light guide plate for the surface light source which overcome the above-mentioned disadvantages are desired.

SUMMARY OF THE INVENTION

An object of the present invention is to provide a surface light source having uniform luminance.

Another object of the present invention is to provide a light guide plate used in a surface light source, the light guide plate providing uniform luminance.

To achieve the above objects, a surface light source comprises a light guide plate and a light source. The light guide plate has an incident surface and an emitting surface. The light source is adjacent to the incident surface of the light guide plate, for radiating light beams into the light guide plate through the incident surface. The emitting surface defines a large number of prisms, in which the distance separating each two adjacent prisms changes according to an intensity of the light beams received from the light source. In particular, the distance separating each two adjacent prisms decreases with increasing distance away from the light source. By the cooperation of the prisms and the light source, the surface light source has uniform luminance over the whole emitting surface.

Other objects, advantages and novel features of the invention will become more apparent from the following detailed description when taken in conjunction with the accompanying drawings, in which:

DETAILED DESCRIPTION OF THE PREFERRED EMBODIMENTS

Hereinafter, preferred embodiments of the present invention will be explained in detail with reference to the accompanying drawings.

Figure 1:
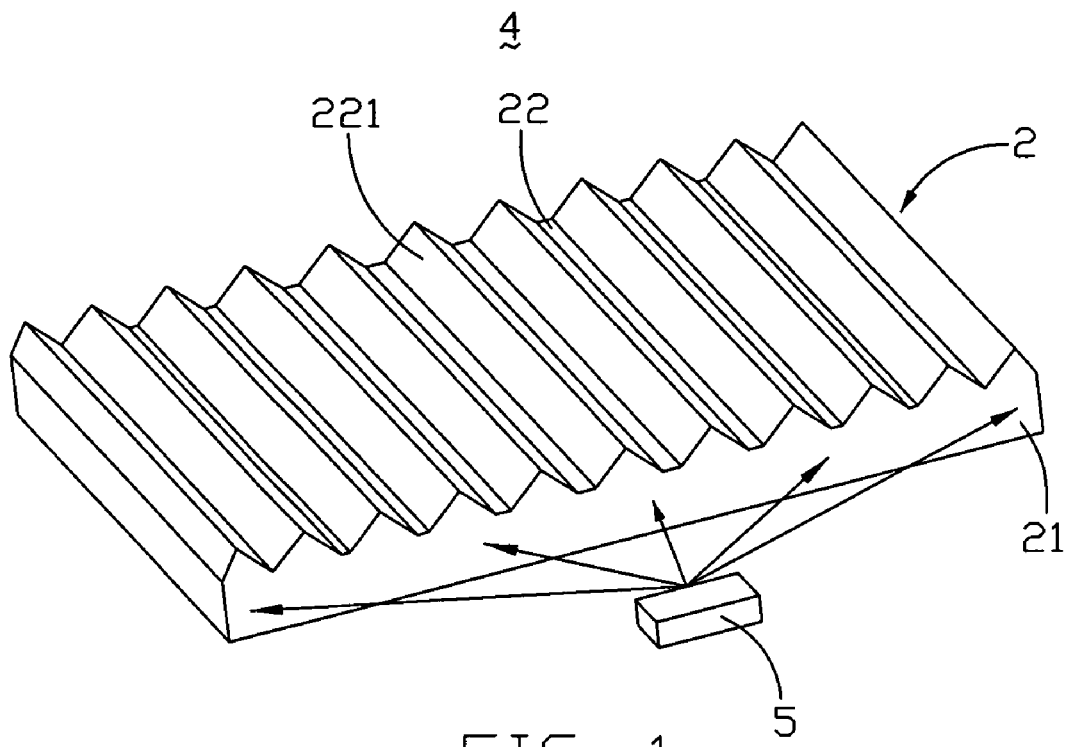
FIG. 1 is an isometric view of a surface light source in accordance with a first embodiment of the present invention, showing an essential optical intensity distribution of light beams emitted from a light source thereof.

As shown in FIG. 1, a surface light source 4 in accordance with the first embodiment of the present invention comprises a plate-like light guide member 2, and a light source 5 disposed adjacent to the light guide plate 2. The light source 5 is a point light source such as an LED, and emits light beams into the light guide plate 2.

The light guide plate 2 defines a light emitting surface 22, and a light incident surface 21 perpendicular to the light emitting surface 22. The light guide plate 2 is generally rectangular, and is made from a transparent glass or a synthetic resin. Various kinds of highly transparent synthetic resins may be used, such as acrylic resin, polycarbonate resin, vinyl chloride resin, etc. The light guide plate 2 may be other than rectangular, for example square or ovoid.

Figure 2:
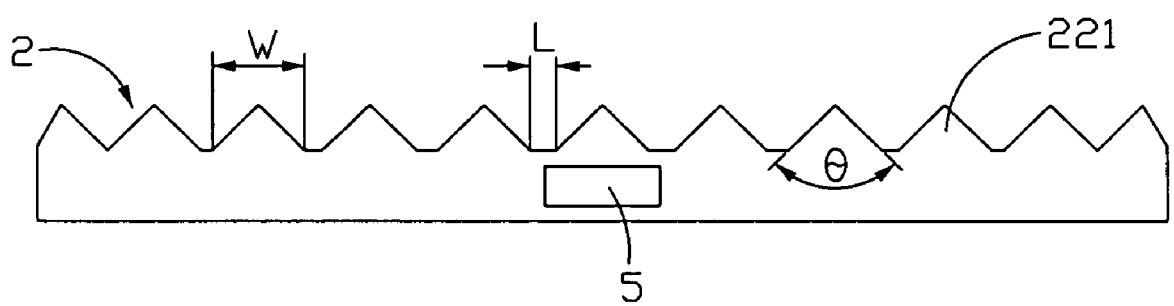
FIG. 2 is a front elevation of the surface light source of FIG. 1.

Referring to FIG. 2, the light emitting surface 22 defines a plurality of prisms 221 as diffractive elements, which are parallel to each other and which have the same vertex angle or similar vertex angles. The vertex angle is in the range from 75°-135°, and is preferably 90°. The light source 5 is disposed opposite to a middle part of the light incident surface 21. Accordingly, the prisms 221 are formed with a distribution density that progressively increases from a middle area (not labeled) to two sides (not labeled) respectively of the light guide plate 2. Each prism 221 has a width W, and a distance separating adjacent prisms 221 is defined as L. The prisms 221 comply with the equation of:

$$n=L/W\leq 0.2$$

The width W of each prism 221 is in the range from 50-100 µm, and is preferably 75 µm. The distance L and the ratio n decrease with increasing distance away from the middle area of the light guide plate 2. In the preferred embodiment, the ratio n of the distance L to the width W is substantially 0.2 in the middle area of the light guide plate 2, and this figure progressively decreases with increasing distance away from the middle area. At two side extremities (not labeled) of the light guide plate 2, the distance L is zero, and the ratio n is zero too.

In operation, light beams from the point light source 5 are introduced into the light guide plate 2 through the light incident surface 21. The intensity of the light beams decreases from the middle area to the two sides of the light guide plate 2, which is complementary to the distribution density of the prisms 221. That is, because the prisms 221 have a high distribution density at the two sides of the light guide plate 2 and a low distribution density at the middle area, the prisms 221 can enhance the intensity of the light beams at the two sides of the light guide plate 2 and effectively compensate the uneven illumination intensity received from the light source 5. Thus, the surface light source 4 can eliminate dark areas with a relatively low luminance, and attain uniform luminance over the whole light emitting surface 22 of the light guide plate 2.

Figure 3:
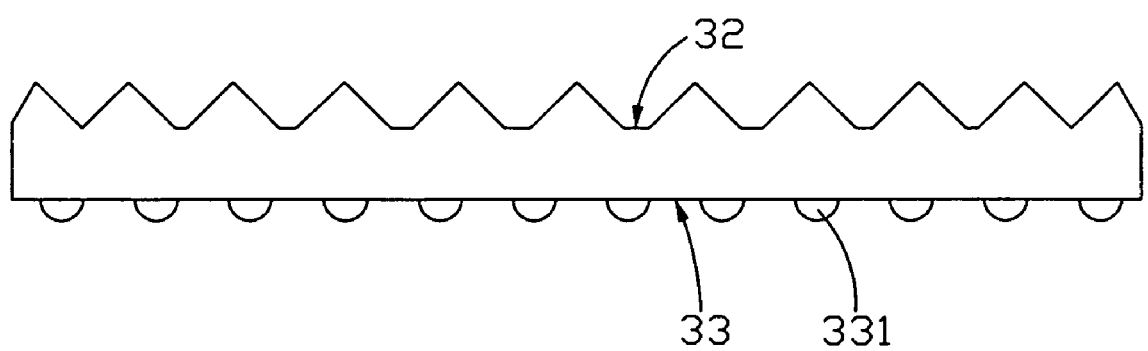
FIG. 3 is a front elevation of a light guide plate in accordance with a second embodiment of the present invention.
Figure 4:
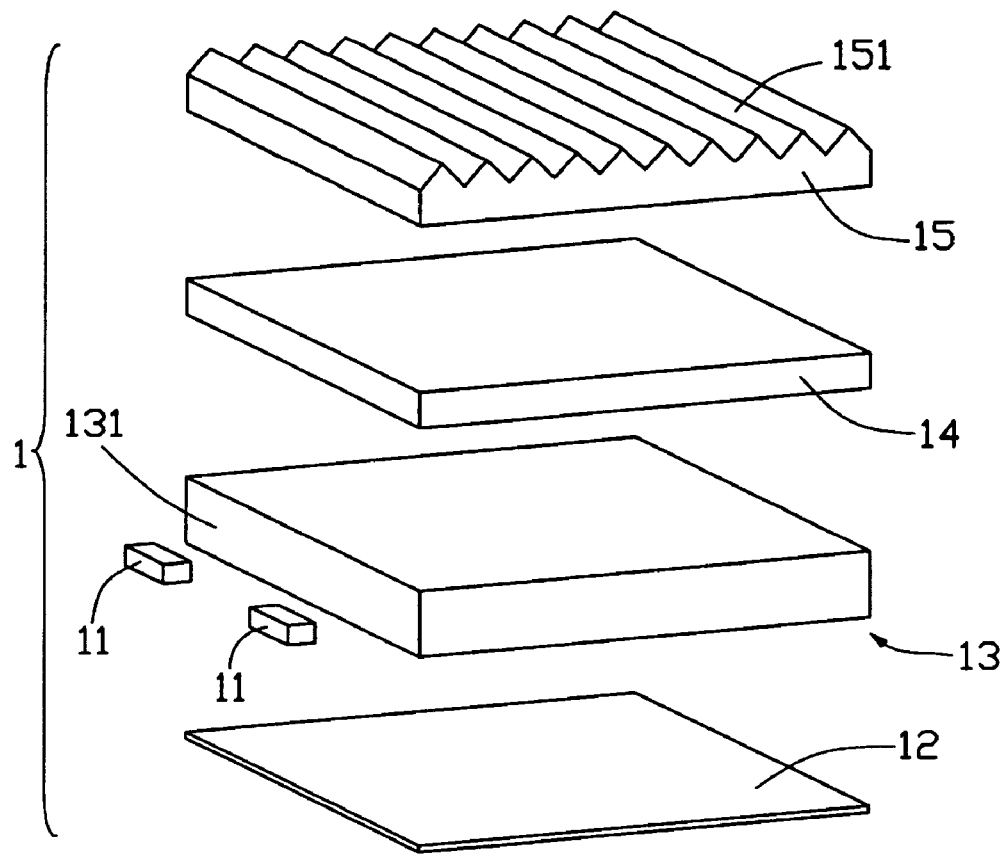
FIG. 4 is an exploded, isometric view of a conventional surface light source, which comprises a light guide plate and two point light sources.
Figure 5:
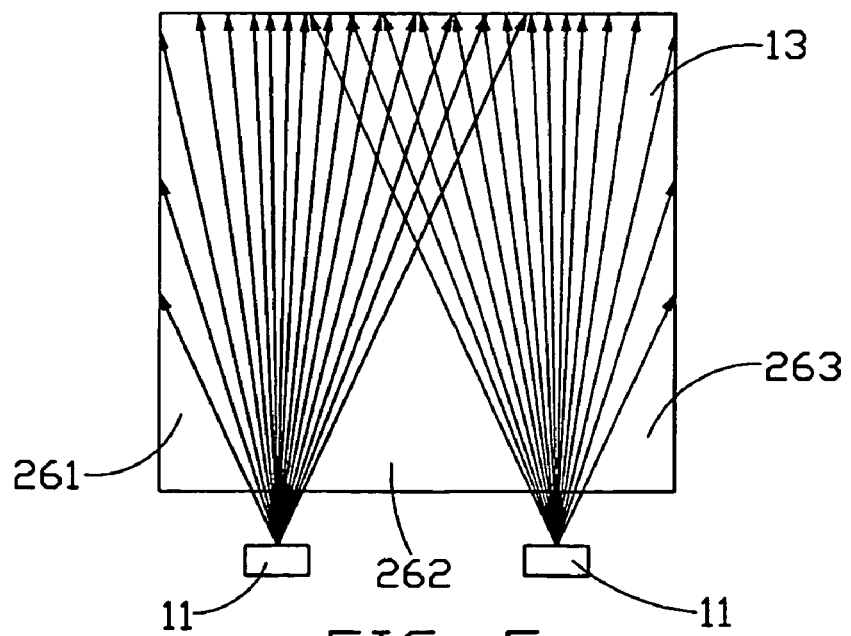
FIG. 5 is a top elevation of the light guide plate and point light sources of FIG. 4, showing an essential optical intensity distribution of light beams in the light guide plate.
Figure 6:
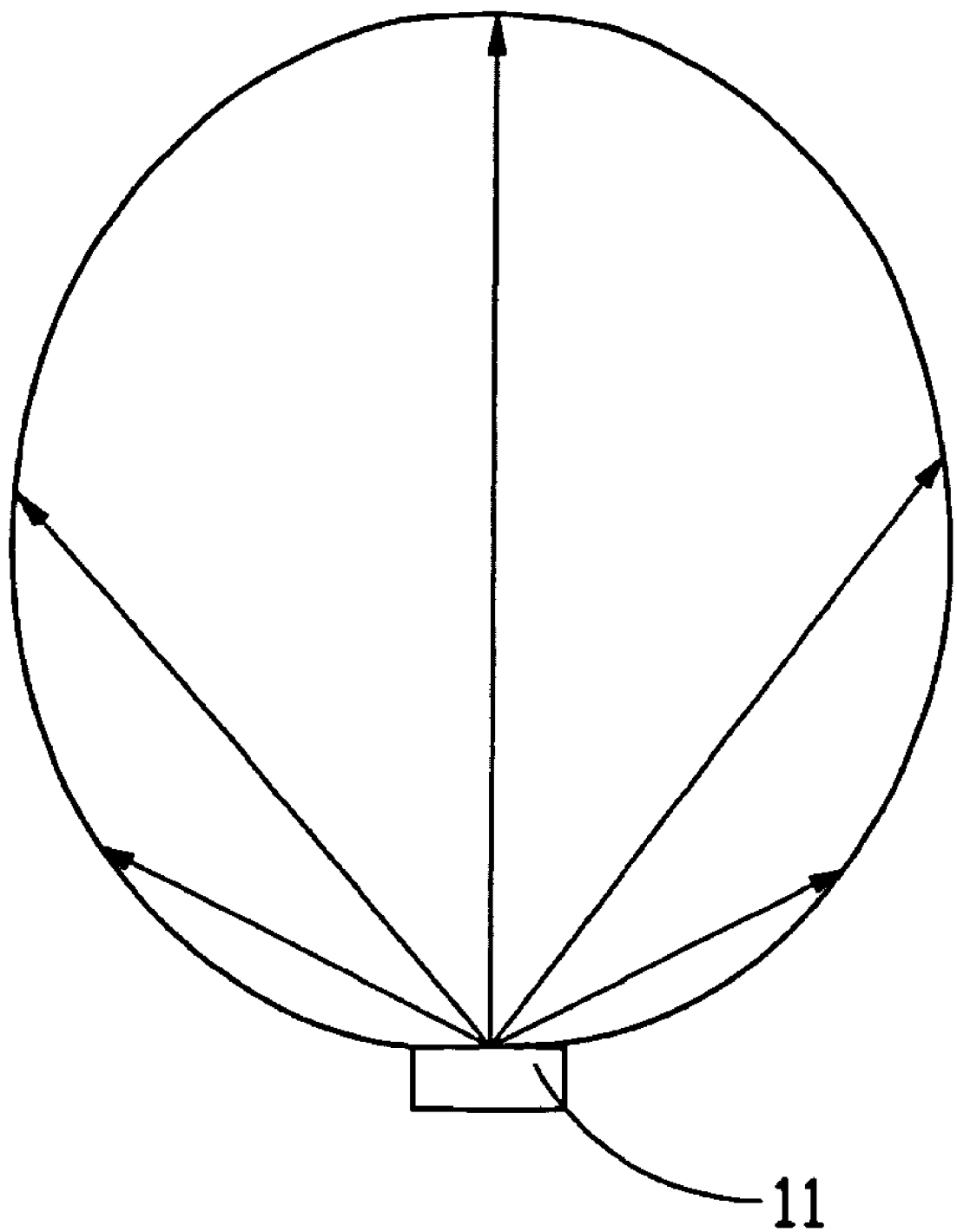
FIG. 6 is a top elevation of one of the point light sources of FIG. 4, showing an essential optical intensity distribution thereof.

FIG. 3 shows a light guide plate 3 in accordance with the second embodiment of the present invention. The light guide plate 3 has a structure similar to that of the light guide plate 2 of the first embodiment, and further comprises a large number of scattering dots 331. The scattering dots 331 are disposed on a bottom surface 33 of the light guide plate 3, for eliminating total internal reflection of light beams in the light guide plate 3. The bottom surface 33 is opposite to a light emitting surface 32 of the light guide plate 3. That is, light beams incident on the light guide plate 32 are reflected and scattered by the scattering dots 331 in directions toward the light emitting surface 32, in order to enhance the uniform illumination of the light guide plate 3.

The surface light source 4 of the present invention has the advantage of uniform luminance over the whole light emitting surface 22, 32 of the light guide plate 2, 3. This is achieved by configuring the distribution density of the prisms 221 to compensatingly correspond to the intensities of the light beams received from the light source 5. Furthermore, because the surface light source 4 has the good optical characteristics of the light guide plate 2, 3 with the prisms 221 on the emitting surface 22, 32, there is no need for additional optical films (such as a brightness enhancing film (BEF) or a diffuser) to enhance the optical characteristics of the light guide plate 2, 3. Thus the surface light source 4 is compact and inexpensive.

In alternative embodiments of the present invention, the light source 5 can be a linear light source such as a cold cathode fluorescent lamp instead of a point light source. Additionally, instead of only a single light source 5, two or more light sources 5 can be employed according to need. Furthermore, the distance L and the width W regarding the prisms 221 can be adjusted according to the optical characteristics of the actual light source 5 used, to ensure uniformity of the light beams over the whole light emitting surface 22, 32.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A system for a surface light source, comprising:
a light source; and
a light guide member adjacent to said light source, and light from said light source passing through an incident surface of said light guide member into said light guide member and transmissible in said light guide member along a pathway defined therein; and
a plurality of triangular-sectional prisms interferingly located in said pathway and disposed along a surface of said light guide member, each of the prisms having a ridge line extending substantially perpendicular to said incident surface thereof, a ratio of a distance between every two of said prisms to a width of one of said every two prisms decreasing from one location of said prisms at said surface of said light guide member near said light source to another location of said prisms at said surface of said light guide member far away from said light source.

2. The system of claim 1, wherein said ratio decreases due to decrease of said distance from said one location to said another location.

3. The system of claim 1, wherein said ratio ranges from 0.2 to 0.

4. The system of claim 1, wherein each of said prisms is integrally formed with said light guide member.

5. The system of claim 4, wherein a vertex angle of each of said prisms is in a range of 75°-135°.

6. The system of claim 5, wherein the vertex angle of each of said prisms is 90°.

7. The system of claim 4, wherein a width of each of said prisms is in a range of 50-100 µm.

8. The system of claim 1, wherein said light from said light source leaves said light guide member from said surface of said light guide member and said prisms.

9. The system of claim 1, wherein said light from said light source passes through said light guide member along two pathways to reach said one location of said prisms and said another location of said prisms respectively.

10. A light guide plate, comprising:
an incident surface for receiving light beams from a light source; and
an emitting surface for emitting light beams;
wherein a plurality of triangular-sectional prisms is formed on one of said incident surface and said emitting surface, each of said prisms has a ridge line extending substantially perpendicular to said incident surface, a ratio of a distance between every two adjacent prisms to a width of one of said every two adjacent prisms decreasing from one location of said prisms at one of said incident surface and said emitting surface near said light source to another location of said prisms at one of said incident surface and said emitting surface far away from said light source.

11. The light guide plate of claim 10, wherein said ratio decreases due to decrease of said distance between every two adjacent prisms from said one location to said another location.

12. The light guide plate of claim 10, wherein said ratio ranges from 0.2 to 0.

13. The light guide plate of claim 10, wherein each of said prisms is integrally formed with said light guide plate.

14. The light guide plate of claim 10, wherein a vertex angle of each of said prisms is in a range of 75°-135°.

15. The light guide plate of claim 14, wherein the vertex angle of each of said prisms is 90°.

16. The light guide plate of claim 10, wherein a width of each of said prisms is in a range of 50-100 μm.

* * * * *